(12) United States Patent
Winkler

(10) Patent No.: US 6,620,492 B1
(45) Date of Patent: Sep. 16, 2003

(54) LAMINATE MADE OF TWO FILM MATERIALS WITH DIFFERENT TEAR RESISTANCE VALUES, PARTICULARLY MADE OF POLYESTER AND POLYETHYLENE

(75) Inventor: Michael E. Winkler, Cape Girardeau, MO (US)

(73) Assignee: Nordenia USA, Inc., Jackson, MO (US)

( * ) Notice: Subject to any disclaimer, the term of this patent is extended or adjusted under 35 U.S.C. 154(b) by 0 days.

(21) Appl. No.: 10/341,915

(22) Filed: Jan. 14, 2003

(51) Int. Cl.⁷ .............................. B32B 7/00; B32B 7/04; B32B 27/08; B32B 27/32; B32B 27/36
(52) U.S. Cl. ..................... 428/212; 428/480; 428/483
(58) Field of Search ............................... 428/35.7, 36.9, 428/36.92, 212, 480, 483

(56) References Cited

U.S. PATENT DOCUMENTS 4,912,103 A * 3/1990 Sibbach et al. ............. 428/215
5,654,082 A * 8/1997 Kagawa ....................... 428/212
5,997,968 A * 12/1999 Dries et al. ................. 428/35.7
6,403,176 B1 * 6/2002 Patouraux et al. ......... 428/35.2

FOREIGN PATENT DOCUMENTS

| JP | 56-005760 | * | 1/1981 |
| JP | 63-312145 | * | 12/1988 |
| JP | 03-086537 | * | 4/1991 |

* cited by examiner

*Primary Examiner*—Vivian Chen
(74) *Attorney, Agent, or Firm*—Collard & Roe, P.C.

(57) ABSTRACT

A laminate is provided made of two film materials with different tear resistance values, particularly made of polyester and polyethylene. The part of the laminate made from a film material with a high tear resistance is structured in multiple layers and has at least two layers made from this high tear resistance material connected with one another by an adhesive layer with a low shear resistance. This structure results in a laminate having improved tear resistance.

7 Claims, No Drawings

LAMINATE MADE OF TWO FILM MATERIALS WITH DIFFERENT TEAR RESISTANCE VALUES, PARTICULARLY MADE OF POLYESTER AND POLYETHYLENE

BACKGROUND OF THE INVENTION

1. Field of the Invention

The present invention relates to a laminate made of two film materials wish different tear resistance values, and in particular to a laminate made of polyester and polyethylene.

2. The Prior Art

Laminates made of a polyester (PET) layer and a polyethylene (PE) layer demonstrate insufficient tear resistance. The tear resistance of the laminate material is significantly lower than the tear resistance of the polyethylene, even if the thickness of the polyethylene layer is much greater than the thickness of the polyester layer. Specifically, the tear resistance of the laminate material is determined by the low tear resistance values of the polyester. A corresponding behavior is also shown by laminates of other film materials that differ greatly with regard to their tear resistance, e.g. in the case of laminates made of oriented polypropylene (OPP) and polyethylene (PE).

SUMMARY OF THE INVENTION

It is an object of the present invention to improve he tear resistance of a laminate made of materials tea have very different tear resistance values.

This object accomplished, according to the invention, with a laminate in which the part of the laminate that is made from a film material with a high tear resistance is structured in multiple layers and has at least two layers made from this high tear resistance material. These layers are connected with one another with an adhesive layer having a low peel resistance. The peel resistance as set up so that the layers can be pulled off, i.e. peeled off one another. Preferably, the adhesive layer is structured so that the layers can be separated from one another with a peel force between 4 g/cm (3.9 N/m) and 120 g/cm (118 N/m). With the layer structure according to the invention, the tear strength of the laminate can be improved by many times. When using viscous adhesives for a non-elastomer bond between the layer, the multi-layer arrangement of the part of the laminate made from high tear resistance has the effect of more advantageously distributing the force introduced into the laminate cross-section.

It is practical if the part of the laminate that contains a film material with a high tear resistance is also connected with the layer that contains the other film material (which demonstrates a comparatively low tear resistance) by an adhesive layer with a low shear resistance.

Typically, the film material with a high tear resistance has a tear resistance measured according to Elmendorf of at least 80 g/$\mu$m (784.8 N/mm) in the machine direction and of at least 120 g/$\mu$m (1,177.2 N/mm) in the crosswise direction. The layer that contains the other film material preferably has a tear resistance of less than 0.8 g/$\mu$m (7.85 N/mm) in the machine and crosswise directions.

The Invention is particularly suitable for laminates made of polyester (PET) and polyethylene (PE). This will be explained in the following, using an exemplary embodiment.

DETAILED DESCRIPTION OF THE PREFERRED EMBODIMENT

A laminate made of polyester (PET) and a polyethylene (PE) film was produced. For the pure materials, the following tear resistance values were measured according to Elmendorf:

| | | |
|---|---|---|
| Polyester PET, 12 $\mu$m | MD | 0.7 g/$\mu$m (6.87 N/mm) |
| | CD | 0.7 g/$\mu$m (6.87 N/mm) |
| Polyethylene PE, 140 $\mu$m | MD | 80 g/$\mu$m (784.8 N/mm) |
| | CD | 120 g/$\mu$m (1,177.2 N/mm) |

The laminate produced from the single-layer polyethylene film and the polyester layer possessed a tear resistance of 1.2 g/$\mu$n (11.77 N/mn) in the machine direction (MD) and a tear resistance of 2 g/$\mu$m (19.6 N/mm) in the crosswise direction (CD), measured according to Elmendorf in each instance. Subsequently, a laminate was produced according to the invention, made of the 12 $\mu$m thick polyester material PET and polyethylene (140 $\mu$m). The layer thickness of the laminate was 152 $\mu$m, in total. The part of the laminate consisting of PE was structured in two layers. The two PE layers were connected by an adhesive layer having a low peel resistance. The laminate produced according to the invention demonstrated a tear resistance, determined according to Elmendorf, of 3.5 g/$\mu$m (34.3 N/mm) in the machine direction (MD) and a tear resistance of 6 g/$\mu$m (58.9 N/mm) in the crosswise direction (CD). Thus, with the laminate according to the invention, it was possible to improve the tear resistance values by three times.

While only one embodiment of he present invention has been shown an described, it is to be understood that many changes and modifications may be made thereunto without departing from the spirit and scope of the invention as defined in the appended claims.

What is claimed is:

1. A laminate comprising:
   (a) at least two first film layers, each of said first film layers comprising a first film material having a first tear resistance;
   (b) an adhesive layer disposed between said two first film layers; and
   (c) a second film layer disposed on one of said first film layers comprising a second film material having a second tear resistance less than sad first tear resistance.

2. The laminate according to claim 1 further comprising a second adhesive layer disposed between at least one of said first film layers and said second film layer.

3. The laminate according to claim 2 wherein said second film material has a tear resistance measured according to Elmendorf of less than 0.8 g/$\mu$m in the machine and crosswise directions.

4. The laminate according to claim 2 wherein said second adhesive layer has a peel resistance such that said at least one of said first film layers may be separated from said second film layer with a peel force between 4 g/cm and 120 g/cm.

5. The laminate according to claim 1 wherein said first film material comprises polyethylene and said second film material comprises polyester.

6. The laminate according to claim 1 wherein said first film material has a tear resistance measured according to Elmendorf of at least 80 g/$\mu$m in the machine direction and of at least 120 c/$\mu$m in the crosswise direction.

7. The laminate according to claim 1 wherein said adhesive layer has a peel resistance such that said first film layers may be separated from one another with a peel force between 4 g/cm and 120 g/cm.

* * * * *

UNITED STATES PATENT AND TRADEMARK OFFICE
CERTIFICATE OF CORRECTION

PATENT NO.    : 6,620,492 B1
DATED         : September 16, 2003
INVENTOR(S)   : Winkler-1

It is certified that error appears in the above-identified patent and that said Letters Patent is hereby corrected as shown below:

Column 2,
Line 42, after the word "than", please change the word "sad" to -- said --.
Line 61, "c/$\mu$m" should correctly read -- g/$\mu$m --.

Signed and Sealed this

First Day of June, 2004

JON W. DUDAS
*Acting Director of the United States Patent and Trademark Office*